No. 851,537. PATENTED APR. 23, 1907.
H. LINDSAY.
CULTIVATOR.
APPLICATION FILED NOV. 17, 1906.
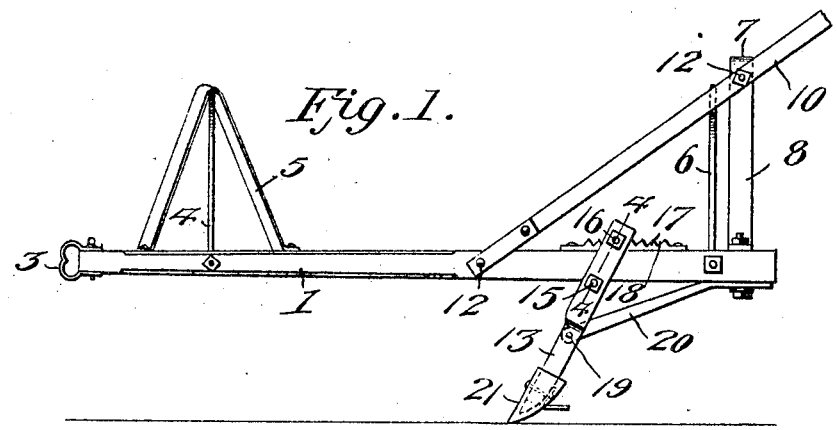
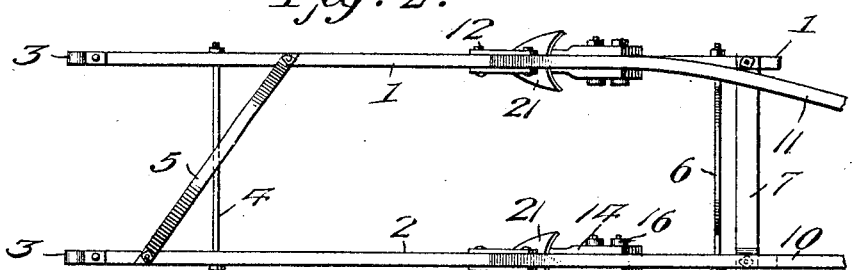
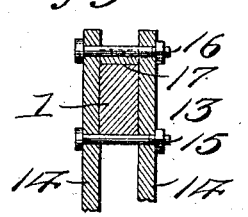
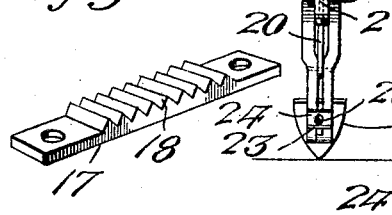
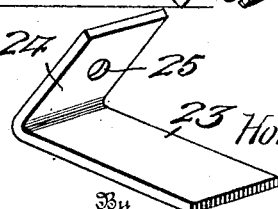
Witnesses
Frank B. Hoffman
R. M. Smith
Inventor
Horace Lindsay
By Victor J. Evans
Attorney

UNITED STATES PATENT OFFICE.

HORACE LINDSAY, OF BRENHAM, TEXAS.

CULTIVATOR.

No. 851,537.   Specification of Letters Patent.   Patented April 23, 1907.

Application filed November 17, 1906. Serial No. 343,940.

*To all whom it may concern:*

Be it known that I, HORACE LINDSAY, a citizen of the United States of America, residing at Brenham, in the county of Washington and State of Texas, have invented new and useful Improvements in Cultivators, of which the following is a specification.

This invention relates to cultivators of the type known as straddle-row, the object of the invention being to provide a straddle-row cultivator in which provision is made for thoroughly bracing the oppositely arranged beams relatively to each other; also means for adjusting the angle of the standards and the height of the shovels and, at the same time, bracing the standards; also means for regulating or gaging the depth or cut or penetration of the shovels.

With the above and other objects in view, the invention consists in the novel construction, combination and arrangement of parts hereinafter more fully described, illustrated and claimed.

In the accompanying drawings, Figure 1 is a side elevation of a cultivator embodying the present invention. Fig. 2 is a plan view of the same. Fig. 3 is a sectional rear elevation thereof, with parts broken away. Fig. 4 is an enlarged detail cross-section, showing the connection between the upper end of one of the standards and the adjacent beam. Fig. 5 is a detail perspective view of one of the racks. Fig. 6 is an enlarged vertical sectional view of the lower end of one of the standards, showing a shovel and depth gage mounted thereon. Fig. 7 is an enlarged detail perspective view of the depth gage.

The cultivator contemplated in this invention comprises the oppositely arranged beams 1 and 2 which extend parallel with each other. Each beam is provided at its forward end with a clevis 3 to which a separate whiffletree may be applied so that a separate draft animal may be hitched to each beam, thus enabling the draft animals to walk at opposite sides of the row of plants being cultivated.

Adjacent to their forward ends, the beams 1 and 2 are connected by a pair of braces 4 and 5, the brace 4 being shown as consisting of an arched rod having the opposite ends thereof bent outward in opposite directions and fixedly secured to the beams, as shown, while the brace 5, which is also in the form of an arched bar, runs obliquely to the path of movement of the cultivator, extending obliquely across and over the top of the brace 4 and preferably resting thereon at the center, as shown in Fig. 3, the opposite ends of the oblique brace 5 being secured firmly to the oppositely arranged beams. The beams 1 and 2 are further connected adjacent to their rear ends by another pair of braces 6 and 7, the brace 6 preferably consisting of an arched rod having its opposite ends rigidly connected to the beams, while the brace 7 consists of a strip of flat metal bent into the form of a flat topped arch and having its opposite ends rigidly secured to the beams. By reference to Fig. 3, it will be noted that one side 8 of the brace 7 extends straight upward, while the other side 9 of said brace is bent over toward the center of the machine.

10 and 11 designate the cultivator handles and under the preferred embodiment of this invention, one of the handles, as 10, inclines upward and backward directly in line with the beam to which it is connected at its forward end, as shown at 12, while the other handle 11 not only inclines upward and rearward from its point of attachment to the beam, but is also deflected inward or inclined obliquely, as shown in Figs. 2 and 3 for the purpose of disposing the hand grips or rear extremities of the handles to one side of the center for enabling the operator to walk at one side of the row of plants while guiding the cultivator. The handles 10 and 11 are connected to the upper portions of the side arms 8 and 9 of the brace 7, as shown at 12.

In connection with each beam, a standard 13 is employed, said standard comprising the twin bars or side pieces 14 which lie on opposite sides of the beam to which they are connected, as shown in Figs. 3 and 4. Each standard is connected to its beam in the following manner. A bolt 15 passes through the twin bars 14 just beneath the beam and another bolt 16 passes through said bars just over the beam, and in connection with the bolt 16, a rack 17 is provided, the same being secured firmly to the upper side of the beam, as clearly shown in Figs. 1 and 4, said rack consisting of a plate or strip having a plurality of teeth 18 on its upper face between which the bolt 16 is adapted to rest to prevent the upper end of the standard from shifting lengthwise of the beam. Each standard has pivotally connected thereto at the point 19, an oblique or inclined brace 20, the opposite or rear end of which is secured to the under side of the beam.

Mounted upon the lower end of each standard 13 is a shovel 21, while in rear thereof is a depth gage 22 having a runner portion 23 which is adapted to rest on the surface of the ground during the operation of the cultivator, and a shank or attaching portion 24 provided with an opening 25 to receive a clamping bolt 26 which also passes through the shovel 21 and between the twin bars 14 of the standard, said bolt serving to clamp both the shovel and the depth gage to the standard and also provide for adjusting the shovel and depth gage up and down on the standard.

By loosening one or both of the bolts which secure the standard to the beam, the upper end of the standard may be moved lengthwise of the rack 17 to engage the bolt 16 in any of the notches or between any of the teeth of the rack to give the desired inclination to the standard and height to the shovel and depth gage, and when the desired adjustment is obtained, the bolt or bolts are tightened, thus holding the parts fixed in their adjusted positions.

I claim:

1. A straddle-row cultivator embodying oppositely arranged beams, and standards, and shovels carried thereby, in combination with braces connecting said beams, one of said braces being in the form of an arch extending obliquely across the space between the beams, and another brace in the form of an arch extending across the space between the beams and at right angles to the beams, said braces crossing each other at the crown of the arch where they rest one against the other, substantially as described.

2. A straddle row cultivator comprising parallel beams, standards secured to said beams, and shovels secured to said standards, a handle connected to one of said beams and extending backward in alinement therewith, and a handle connected to the opposite beam and curved toward the first mentioned handle to permit the plowman to walk upon one side of the row of plants being cultivated, and an arched brace having its ends connected rigidly to the beams, and the upper portion of said brace being connected to the handles and extending across between the same.

In testimony whereof, I affix my signature in presence of two witnesses.

HORACE $\overset{\text{his}}{\times}$ LINDSAY.
mark

Witnesses:
O. A. SEWARD,
G. A. BROESCHE.